(12) United States Patent
Goldhamer

(10) Patent No.: US 10,531,336 B2
(45) Date of Patent: Jan. 7, 2020

(54) LINK CONTROL IN CENTRALIZED DEPLOYMENTS

(71) Applicant: Mariana Goldhamer, Ramat Gan (IL)

(72) Inventor: Mariana Goldhamer, Ramat Gan (IL)

(*) Notice: Subject to any disclaimer, the term of this patent is extended or adjusted under 35 U.S.C. 154(b) by 0 days.

(21) Appl. No.: 15/896,544

(22) Filed: Feb. 14, 2018

(65) Prior Publication Data
US 2018/0249375 A1     Aug. 30, 2018

Related U.S. Application Data

(60) Provisional application No. 62/463,659, filed on Feb. 26, 2017.

(51) Int. Cl.
| | | |
|---|---|---|
| *H04W 28/08* | (2009.01) | |
| *H04L 1/18* | (2006.01) | |
| *H04W 36/22* | (2009.01) | |
| *H04W 88/08* | (2009.01) | |
| *H04W 92/12* | (2009.01) | |
| *H04W 28/02* | (2009.01) | |

(52) U.S. Cl.
CPC .......... *H04W 28/08* (2013.01); *H04L 1/1812* (2013.01); *H04W 36/22* (2013.01); *H04W 28/0268* (2013.01); *H04W 88/08* (2013.01); *H04W 92/12* (2013.01)

(58) Field of Classification Search
None
See application file for complete search history.

(56) References Cited

U.S. PATENT DOCUMENTS

| | | | |
|---|---|---|---|
| 8,681,608 B2* | 3/2014 | Lee ................. | H04L 1/1835 370/229 |
| 2014/0185496 A1 | 7/2014 | Wolf et al. | |
| 2016/0234712 A1* | 8/2016 | Nadas ............... | H04W 28/0247 |

(Continued)

OTHER PUBLICATIONS

3GPP TS 36.300 v14.0.0, (Sep. 2016) Technical Specification Group Radio Access Network; Evolved Universal Terrestrial Radio Access (E-UTRA) and Evolved Universal Terrestrial Radio Access Network (E-UTRAN); Overall description; Stage 2 (Release 14).

(Continued)

*Primary Examiner* — Eunsook Choi

(57) ABSTRACT

A method for cellular network operation includes establishing a transport network communication link in a cellular network between first and second infrastructure cellular entities. A first transport link control function is established within the first infrastructure cellular entity, and a pair transport link control function is established within the second infrastructure cellular entity. Data packets are transmitted through the first and second transport link control functions on the transport network communication link while allocating sequence numbers by the first transport link control function to the transmitted data packets. The pair transport link control function detects, based on the sequence numbers, a loss of a data packet transmitted by the first transport link control function and transmits a status report to the first transport link control function. The forwarding of user traffic from the first infrastructure cellular entity to the second infrastructure cellular entity is controlled responsively to the reports.

19 Claims, 4 Drawing Sheets

(56) References Cited

U.S. PATENT DOCUMENTS

2019/0059031 A1* 2/2019 Hahn .................. H04W 36/08

OTHER PUBLICATIONS

3GPP TS 36.322 V13.2.0 (Jun. 2016) Technical Specification Group Radio Access Network; Evolved Universal Terrestrial Radio Access (E-UTRA); Radio Link Control (RLC) protocol specification (Release 13).

3GPP TS 23.501 V0.2.0 (Jan. 2017) Technical Specification Group Services and System Aspects; System Architecture for the 5G System; Stage 2 (Release 15).

3GPP TR 38.801 v1.0.0 (Dec. 2016) Technical Specification Group Radio Access Network; Study on New Radio Access Technology; Radio Access Architecture and Interfaces (Release 14).

* cited by examiner

LINK CONTROL IN CENTRALIZED DEPLOYMENTS

FIELD OF THE INVENTION

The invention relates generally to digital communication systems and in particular to cellular systems using the virtualization of part of base station functions.

BACKGROUND OF THE INVENTION

As part of the 3GPP 5G study a base station architecture was proposed in which the base station includes a Central Unit (CU) and Distributed Units (DU).

The traditional protocol layers are split between CU and DU.

One of the drawbacks of this solution is that packets might be lost on the CU-DU interface without the possibility to identify the packets lost over the transport network, retransmit them and eventually increase the reliability of the communication over the transport network.

SUMMARY

There is provided, in accordance with an embodiment of the invention, a method for cellular network operation, which includes establishing a transport network communication link in a cellular network between a first infrastructure cellular entity and a second infrastructure cellular entity for transmitting data packets containing user traffic. A first transport link control function is established within the first infrastructure cellular entity at one side of the transport network communication link, and a pair transport link control function is established within the second infrastructure cellular entity at the other side of the transport network communication link. Data packets are transmitted through the first transport link control function to the pair transport link control function through the transport network communication link while allocating sequence numbers by the first transport link control function to the transmitted data packets. The pair transport link control function detects, based on the sequence numbers, a loss of a data packet transmitted by the first transport link control function and transmits a status report indicative of the loss of the data packet to the first transport link control function. Reports are transmitted from at least one of the first and second transport link control functions to a central controller or coordinator of at least one base station in the cellular network regarding a behavior of the transport network communication link. Responsively to the reports, forwarding of user traffic from the first infrastructure cellular entity to the second infrastructure cellular entity is controlled.

In one embodiment, the first infrastructure cellular entity is a base station and the second infrastructure cellular entity is a gateway controlled by a mobility management entity. Alternatively, the first infrastructure cellular entity is a gateway controlled by a mobility management entity and the second infrastructure cellular entity is a base station. Further alternatively, the first infrastructure cellular entity is a central unit of a base station and the second infrastructure cellular entity is a distributed unit or a remote radio head of the base station controlled by the central unit of the base station. In another embodiment, the first infrastructure cellular entity is a distributed unit of the base station controlled by the central unit of the base station and the second infrastructure cellular entity is the central unit of a base station.

In a disclosed embodiment, establishing the first transport link control function and the pair transport link control function includes establishing a specific transport link control function instance for at least one functionality selected from a list of functionalities consisting of a quality of service, a network slice, and a PDU (Protocol Data Unit) session.

In some embodiments, the reports to the central controller or coordinator regarding the behavior of the transport network communication link include at least one element selected from a list of elements consisting of a traffic amount, a number of lost packets, a packet error rate, a bit error rate, an average delay, a maximum delay, a median delay, a minimum delay, and a percentage of packets with the delay lower than a value. In one embodiment, the reports are used to assess a transport network congestion. In case of an assessed congestion on a transport network link, an instruction can be sent from the central controller or coordinator to a UE to perform a handover to another base station or distributed unit.

In some embodiments, the method includes sending configuration or control messages from a central control or coordination function or entity in the cellular network to the first or the pair transport link control function. In one embodiment, the coordination or control messages are sent to a Transport Link Control entity operating in one of a Transparent Mode, an Unacknowledged Mode, and an Acknowledged Mode assigns a specific Transport Link Control instance to that entity. The coordination or control messages sent to a Transport Link Control entity operating in one of a Transparent Mode, an Unacknowledged Mode, and an Acknowledged Mode may assign specific operational parameters to the Transport Link Control entity or to a specific instance of the Transport Link Control entity.

In a disclosed embodiment, responsively to a negative status report transmitted from the pair transport link control function, the first transport link control function executes a retransmission of the lost packet.

In some embodiments, the forwarding of the user traffic includes controlling a UE (User Equipment) to execute a handover from the second infrastructure cellular entity to a third infrastructure cellular entity. The first transport link control function may buffer the user traffic for a duration depending on a transport network delay.

There is also provided, in accordance with an embodiment of the invention, a system for cellular network communications, including a first infrastructure cellular entity and a second infrastructure cellular entity, which are configured to establish between them a transport network communication link in a cellular network for transmitting data packets containing user traffic.

The first infrastructure cellular entity is configured to establish a first transport link control function at one side of the transport network communication link, and the second infrastructure cellular entity is configured to establish a pair transport link control function at the other side of the transport network communication link. The first infrastructure cellular entity is configured to transmit data packets through the first transport link control function to the pair transport link control function through the transport network communication link while allocating sequence numbers by the first transport link control function to the transmitted data packets, and the pair transport link control function is configured to detect, based on the sequence numbers, a loss of a data packet transmitted by the first transport link control function and to transmit a status report indicative of the loss of the data packet to the first transport link control function from the pair transport link control function. At least one of the first and second transport link control functions is configured to transmit reports to a central controller or coordinator of at least one base station in the cellular network regarding a behavior of the transport network communication link, wherein forwarding of user traffic from the first infrastructure cellular entity to the second infrastructure cellular entity is controlled responsively to the reports.

There is additionally provided, in accordance with an embodiment of the invention, a distributed unit for use in a base station in a cellular network. The distributed unit includes a radio interface configured to communicate over a wireless link with user equipment in a cellular network, and a network interface configured to communicate with a transport network of the cellular network. A processor is configured to establish a transport network communication link via the transport network with a central unit of the base station for transmitting data packets containing user traffic, and to establish a first transport link control function within the distributed unit, for interaction with a pair transport link control function within the central unit. The first transport link control function is configured to transmit data packets through the first transport link control function to the pair transport link control function through the transport network communication link while allocating sequence to the transmitted data packets, whereby the pair transport link control function detects, based on the sequence numbers, a loss of a data packet transmitted by the first transport link control function and transmits a status report indicative of the loss of the data packet to the first transport link control function. At least one of the first and second transport link control functions transmits reports to a central controller or coordinator of the base station regarding a behavior of the transport network communication link, and forwarding of user traffic from the distributed unit to the central unit is controlled responsively to the reports.

BRIEF DESCRIPTION OF THE DRAWINGS

The drawings do not represent an exhaustive representation of the possible embodiments of the invention and the invention is not limited to the arrangements presented in the drawings.

The drawings are.

DETAILED DESCRIPTION

Embodiments of the invention are described hereinafter in conjunction with the figures.

The following description uses terminology familiar to those skilled in wireless cellular networks and in particular in LTE and 5G technology. This should not be considered as a limitation for the applicability of the invention to other similar technologies or to evolving cellular technologies.

Infrastructure cellular entities, in the context of the present description and in the claims, include base stations, central units, distributed units, remote radio heads, control and management entities, for example central coordinators and Operation and Maintenance (O&M), entities placed in the cellular Core system, including Mobility Control Entity (MME), Core Access and Mobility Management Function (AMF) in 5G, Serving Gateway (S-GW) or UPF (User Plane Function). The term "infrastructure cellular entities" does not include user equipment.

BS (base station) denotes all types of base stations or Access Points, using any technology, produced in 3 GPP or IEEE, including macro, micro, femto or home base station, small cell eNB, relays, remote radio heads, in distributed or centralized architecture, including C-RAN architecture.

A Central Unit (CU) denotes the part of the base station including the higher layer functions and protocol stacks and controlling the Distributed Units. The Central Unit may be virtualized on a computing platform.

A Distributed Unit or Remote Radio Head is a part of the Base Station controlled by a CU and includes the real antennas and may be named also "node". DU includes those protocol layers not included in CU.

A Central Controller or Coordinator is a software module placed on a base station, on a server located at the network edge (routers, etc.), on Internet, in the core network, in the Operation and Maintenance (O&M) system or on a virtualization platform.

A BS function may contain a full or partial RRC (Radio Resource Control), PDCP (Packet Data Convergence Protocol), RLC (Radio Link Control), MAC (Medium Access Control), PHY (Physical Layer) as described in 3 GPP 36.300 v14.0.0.

Some control functions may be grouped under the RRM (Radio Resource Management) group of functions or may be implemented as part of a Central Coordinator (CCORD).

RRC (Radio Resource Control) or MAC (Medium Access Control) are also control functions.

Automatic Repeat reQuest (ARQ) is an error correction method for data transmission that uses acknowledgements (ACKs) included within signaling (control) messages sent by the receiver indicating that it has correctly received a data packet.

If the ACK was not received by the sender after a pre-defined time interval the packet will be retransmitted until the sender receives an acknowledgment or the transmitter exceeds a predefined number of re-transmissions or a pre-defined time interval.

System Deployment

Figure 1:
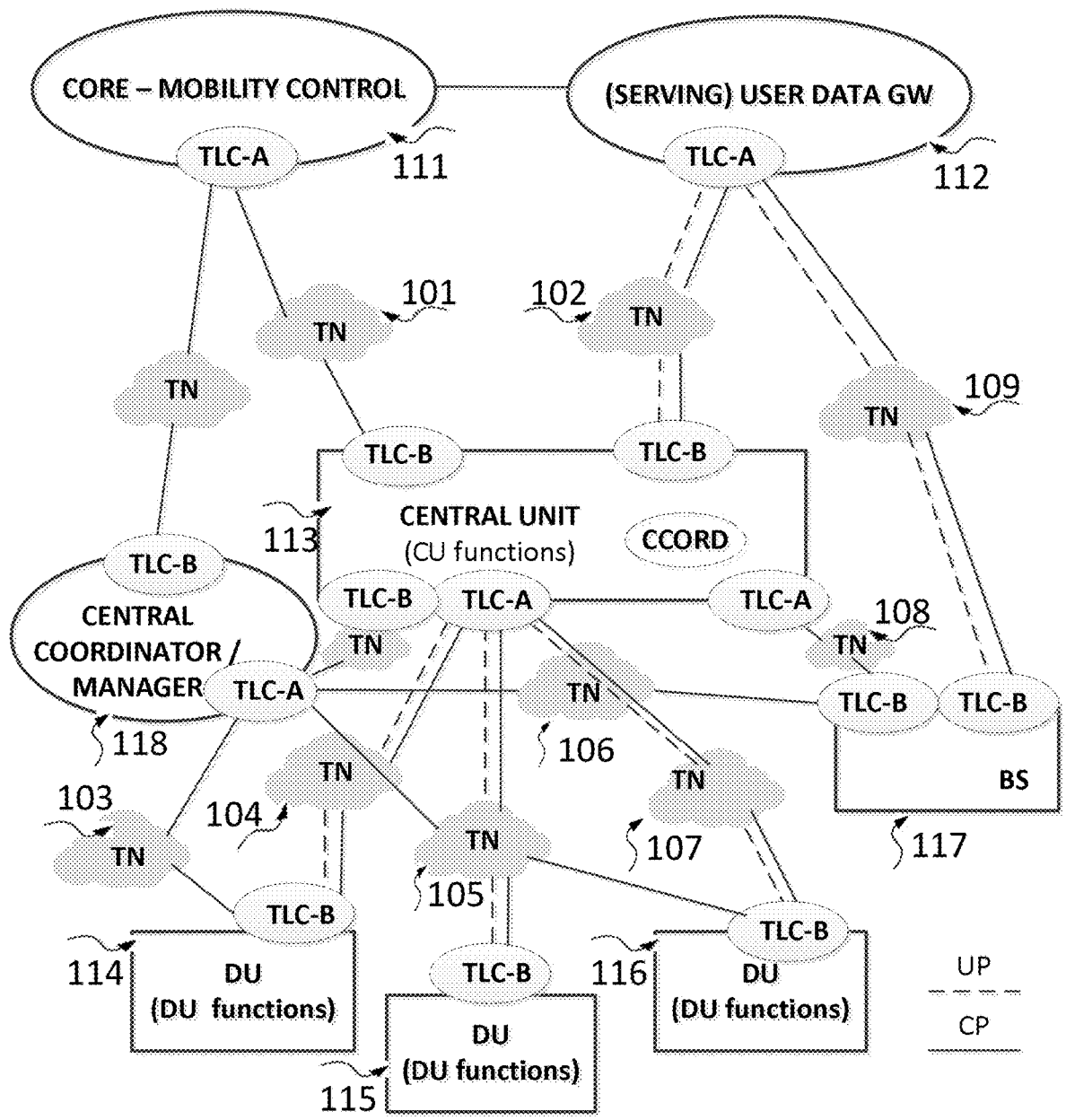
FIG. 1—Represents the system deployment for downlink direction

The system deployment is described in FIG. 1. A BS may be stand-alone as in BS-117 or may be split between a CU-113 and multiple DUs-114,115 and 116. The CU contains a part of the BS functions, for example the big group of RRM (Radio Resource Management) control functions (see TS 36.300 v 14.0.0.), RRC, PDCP, while the DU contains the rest of functions, for example RLC, MAC and PHY.

The Central Coordinator may be a stand-alone unit —118 on the RAN (Radio Access Network) control plane or may be part of the CU-113.

The CU is connected to different DUs through Transport Networks (TN); CU is connected to DU-115 through TN-104 and to DU-116 through TN-107. The transport network may be named in some cases backhaul, mid-haul or fronthaul.

The BS is connected to a Serving Gateway (SG)-112 (in LTE) or in 5G to the equivalent UPF (User Plane Function)

on the User Plane; these connections are shown in FIG. 1 as going respectively over the TN-102 or TN-109. The BS may be also connected to a mobility management entity, such as a Mobility Control Entity-111 (MME in LTE) or a Core Access and Mobility Management Function (AMF) in 5G on the Control plane; this connection is shown in FIG. 1 as going over the TN-101.

FIG. 1 includes two types of system Controller or Coordinator or Managers: one which is included in a BS, like CCord in the CU-113 and one which is external —118. In an embodiment of this invention should be however used only one variant in a given deployment.

The Central Controller or Coordinator —118 is connected to DU-114 through TN-103 and to DU-116 through TN-105, while is connected to the stand-alone BS-117 through TN-106.

A Transport Link Control (TLC) function is implemented on the each traffic direction. In the existing implementations this function is eventually implemented within the transport network, but in an embodiment of this invention this function providing error detection and correction for the transport network through retransmissions is implemented within the cellular system.

TLC entities are hosted by the cellular entities sourcing the traffic; if the traffic is in downlink direction, the TLC at the infrastructure cellular entity sourcing the traffic is shown in FIG. 1 as TLC-A, encompassing all the entities of traffic sourcing, while the pair TLC entity including all the TLC entities receiving the traffic is noted TLC-B.

FIG. 1 shows two types of base stations, which can use the LTE or 5G technology: a BS which is split between a CU-113 and several DUs (114, 115, 116) and a BS-117 which is standalone, i.e. not split.

TLC operation for error correction is similar with RLC operation, i.e. TLC can provide packet error correction through re-transmission.

We name a transport network between two infrastructure cellular entities as "protected" if there is at least one instance of a TLC entity implemented in a first infrastructure cellular entity and assigning a sequence number (UM and AM modes) and an instance of a pair TLC entity implemented in the second infrastructure cellular entity.

One or more links of the entities 114, 115 or 116 can use protected transport, while in other cases un-protected transport can be used (Transparent Mode or nothing). In case that for control messages is used TCP or one of its variants, it is not needed to "protect" the transport networks 101, 103, 104, 105, 106, 108.

Links including the user plane (102, 109, 104, 105, 107, 109) should be always protected.

Figure 2:
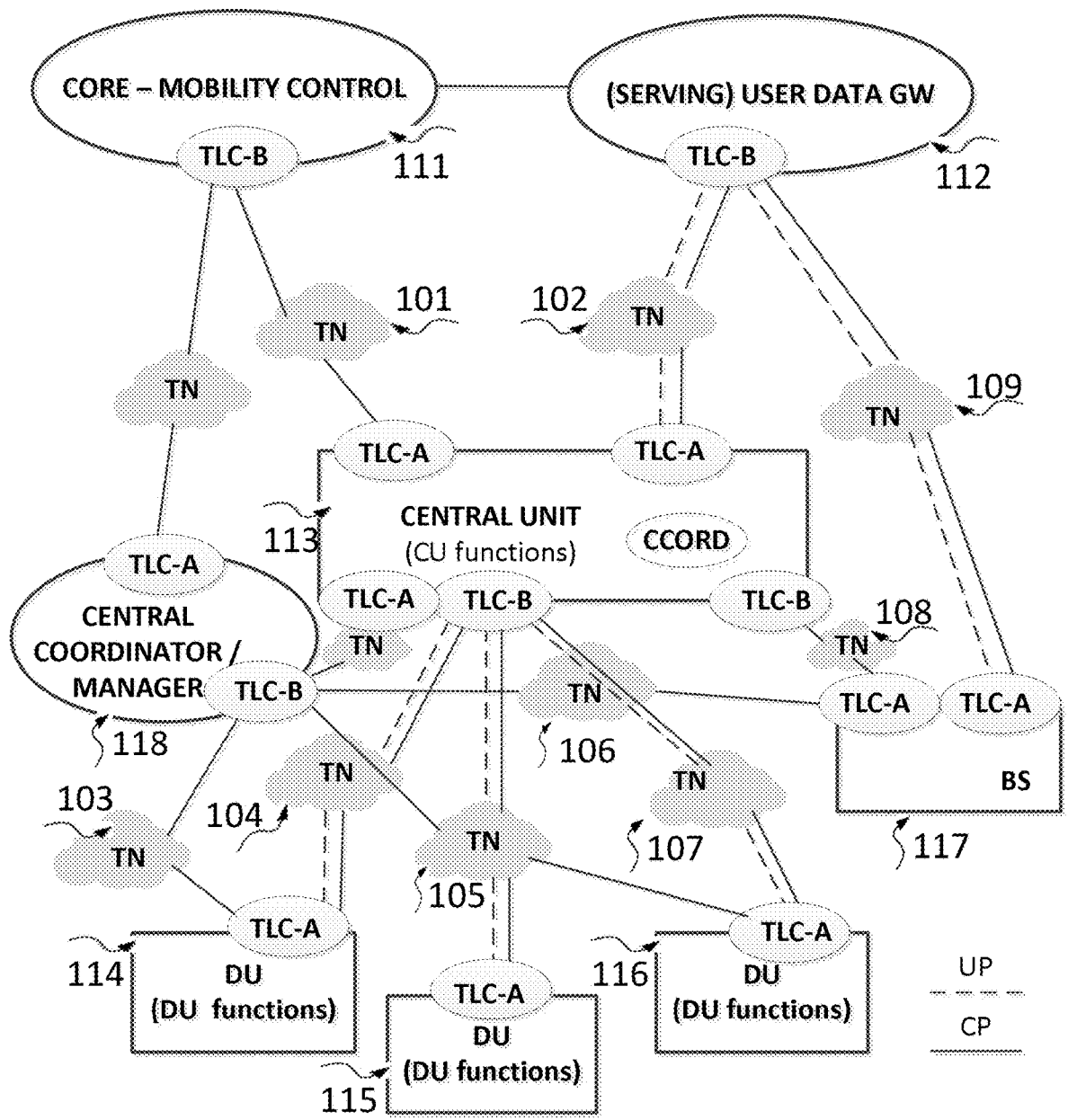
FIG. 2—Represents the system deployment for uplink direction

The system deployment for uplink links is shown in FIG. 2, in which the transmit and receive sides of the transport network links were reversed relatively to FIG. 1.

Need for User Traffic Protection

The user traffic may be sent over a transport network while using UDP (User Datagram Protocol) or RTPC (Real Time Control Protocol) or their variants. In a cellular network the user traffic is encapsulated using the GTP-U protocol (GPRS Tunneling Protocol using UDP), such that the user traffic transmitted between the cellular network entities is not protected and is transmitted with minimum latency.

In some cases the transport network may have its own packet losses, however the network itself either does not applies any ARQ correction (as most of point-to-point wireless links or will disregard the need for protecting the UDP or RTP traffic.

GTP-U protocol does not provide retransmission, such that an additional protocol stack, as defined in this invention, is needed for data protection over transport link within the cellular system.

RLC Function Description

RLC operation is described in 3GPP TS 36.322 v13.2.0 (2016-06) for BS-UE (User Equipment) communication over the air and shortly described below.

Functions of the RLC sub layer are performed by RLC entities. For a RLC entity configured at the base station, there is a peer RLC entity configured at the UE and vice versa.

This standard defines three operational modes: Transparent Mode (TM), Unacknowledged Mode (UM) or Acknowledged Mode (AM). Based on this standard, an RLC entity can operate only in one of the 3 modes for all the types of handled traffic and a set of logical channel, such as control channels and traffic channels are assigned for each entity.

The ARQ is used only in the Acknowledged mode for DL/UL control channel or DL/UL traffic channel.

In the transparent mode the transmitter forms TMD (TM Data) PDUs (Protocol Data Unit) from RLC SDUs (Service Data Unit), but will not segment nor concatenate the RLC SDUs (Service Data Unit) and no RLC headers will be included in the TMD PDUs. The receiver delivers the TMD PDUs (which are just RLC SDUs) to the upper layer.

In the UM a transmitting UM RLC entity forms UMD PDUs from RLC SDUs, and shall segment and/or concatenate the RLC SDUs so that the UMD PDUs fit within the total size of RLC PDU(s) indicated by the lower layer at the particular transmission opportunity notified by lower layer and also include relevant RLC headers in the UMD PDU.

The receiving UM RLC entity receives UMD PDUs and detects whether or not the UMD PDUs have been received in duplication and discards duplicated UMD PDUs, reorders the UMD PDUs if they are received out of sequence, detects the loss of UMD PDUs at lower layers, reassemble RLC SDUs from the reordered UMD PDUs and delivers the RLC SDUs to upper layer in ascending order of the RLC SN (Sequence Number), discards the received UMD PDUs that cannot be re-assembled into a RLC SDU.

The transmitting side of an AM RLC entity forms AMD PDUs from RLC SDUs, and segments and/or concatenates the RLC SDUs so that the AMD PDUs fit within the total size of RLC PDU(s) indicated by lower layer at the particular transmission opportunity notified by lower layer.

Only in AM the transmitting side of an RLC entity supports retransmission of RLC data PDUs (ARQ).

If the RLC data PDU to be retransmitted does not fit within the total size of RLC PDU(s) indicated by lower layer at the particular transmission opportunity notified by lower layer, the AM RLC entity can re-segment the RLC data PDU into AMD PDU segments, the number of re-segmentation being not limited.

When the transmitting side of an AM RLC entity forms AMD PDUs from RLC SDUs received from upper layer or AMD PDU segments from RLC data PDUs to be retransmitted, it shall include relevant RLC headers in the RLC data PDU.

When the receiving side of an AM RLC entity receives RLC data PDUs, detects whether or not the RLC data PDUs have been received in duplication, and discard duplicated RLC data PDUs, reorders the RLC data PDUs if they are received out of sequence, detects the loss of RLC data PDUs at lower layers and requests retransmissions to its peer AM RLC entity, reassemble RLC SDUs from the reordered RLC data PDUs and deliver the RLC SDUs to upper layer in sequence.

PDCP Layer

Figure 4:
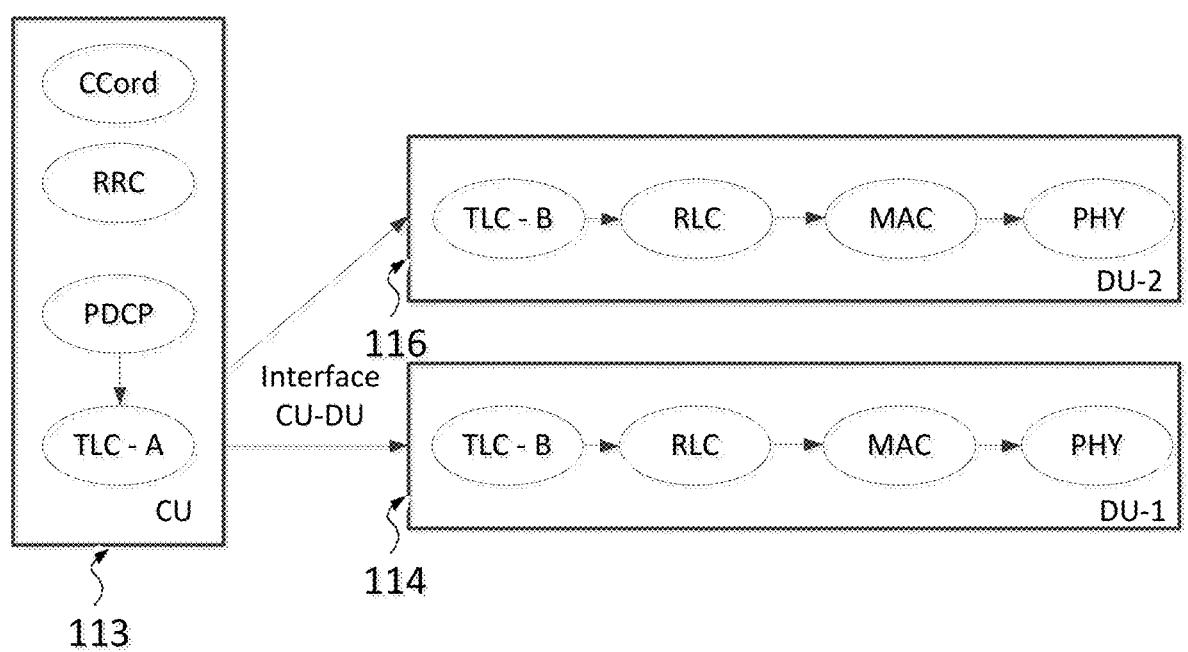
FIG. 4—Represents the new user plane function chain for PDCP-RLC split

In FIG. 4 the higher layer for the TLC entity located on each side of CU-DU interface is PDCP; the higher layer for the RLC entity located in DU is also PDCP, as TLC is at the same level with RLC.

The PDCP layer executes the following functions relevant for an embodiment of this invention: transfer of data (user plane or control plane), maintenance of PDCP SNs, in-sequence delivery of upper layer PDUs at re-establishment of lower layers; ROHC; duplicate elimination of lower layer SDUs at re-establishment of lower layers for radio bearers mapped on RLC AM; timer based discard; duplicate discarding; for split and LWA bearers, routing and reordering. PDCP uses the services provided by the RLC sublayer.

PDCP is used for SRBs, DRBs, and SLRBs mapped on DCCH, DTCH, and STCH type of logical channels. PDCP is not used for any other type of logical channels.

QoS (Quality of Service) Enforcement

The 3GPP system enforces the QoS by defining "bearers" in LTE or "5G QoS flows" in 5G. For each bearer is defined in LTE a CQI (Channel Quality Indicator) identifier which is a scalar identifying a QoS class; the CQI is mapped to a DSCP (Differentiated Services Code Point) value in IP (Internet Protocol) header.

In 5G, as indicated in 3GPP TS 23.501 v 0.2.0 (01-2017), all the traffic mapped to the same 5G QoS Flow receive the same forwarding treatment (e.g. scheduling policy, queue management policy, rate shaping policy, RLC configuration, etc.). Providing different QoS forwarding treatment requires separate 5G QoS Flow.

In a similar mode, 5G QoS Indicator (5QI) is a scalar that is used as a reference to a specific QoS forwarding behavior (e.g. packet loss rate, packet delay budget) to be provided to a 5G QoS Flow.

Service Slice

The new concept of Network Slice enables the allocation of resources per service slices. In TLC AM or RLC AM in an embodiment of this invention, slices related to the IoT (Internet of Things) service may require a higher reliability as compared with other services.

As mentioned in TS23.501 v0.2.1 (2017-01), "Network Slice Selection Policy (NSSP): This policy is used by the UE to associate UE applications with SM-NSSAIs (Session Management-Network Slice Selection Assistance Information) and to determine when a new PDU session should be requested with a new SM-NSSAI."

RLC and TLC Support for OoS and Network Slicing

In a possible embodiment, an instance of the transmit side of the RLC and TLC entity shall be defined only for one combination of QoS and Slice identity, i.e. for each identified QoS category by QCI or by a QoS flow identifier and for each identified Network Slice (NS) shall be a separate instance of RLC or TLS function.

In another embodiment, an instance of RLC or TLC entity can be defined per user application, i.e. per PDU session.

In still other embodiments, an instance of RLC or TLC entity can be defined per network slice or per operator.

In case that the RLC or TLC are collocated with the source of the traffic, it is possible the mapping of the user or control traffic belonging to a specific QoS category and NS (if used) to a specific queue.

In case that the RLC or TLC are not collocated with the source of the traffic, the user data packet shall carry the information of the type of the traffic as applicable (user traffic, control traffic named also signaling traffic), control channel identifier if appropriate, specific QoS category and the identity of the Network Slice or of the PDU session. This can be done by inserting at a well-known position in the packet of an Information Element indicating as appropriate the QoS category or a NS identity or a PDU session identity or a Control Channel ID.

Each instance of the RLC and TLC entities, especially those which are not co-located with the source of traffic, shall have its own identifier which will enable the differentiated configuration of each RLC/RTC instance.

An RLC/TLC instance or a function able to create different queues must be able to identify the appropriate user or control traffic based on appropriate filters (deep packet inspection) which can find specific values for QoS category or a NS identity or a PDU session identity or a Control Channel ID and direct the selected traffic to the appropriate queues or RLC/RTC instances.

For example, if a PDU session is identified by the scalar M and the QoS flow is identified by the scalar P, only those packets matching these values will be processed by the RLC/TLC instance number XX.

Configuration of the RLC/TLC Instance

The configuration of the RLC/TLC instance which is not collocated with the configuring entity will be done by signaling messages belonging to the Control Plane and generated by the RRC entity or RRM entity or CCord indicating the RLC/TLC instance identifier and configuring:

1. The mode of processing, i.e. Transparent mode (TM), Un-Acknowledged mode (UM) or Acknowledged mode (AM).

2. The sequence number size

3. The number of retransmissions or the time-budget for retransmissions

4. The time-out to wait for an ACK

5. Policy rules in case when the number of lost packets or packet error rate or bit error rate or average delay or maximum delay is higher than a threshold. An example of policy rule can be, for example, switching from AM to NAM in case of delay higher than a threshold and the PER is lower than a specific PER value.

An AM RLC entity sends STATUS PDUs to its peer AM RLC entity in order to provide positive and/or negative acknowledgements of RLC PDUs (or portions of them).

Alternatively, the signaling messages will assign a TLC/RLC instance to a specific TLC/RLC entity operating in a given mode.

New Reports

For allowing a control or coordination function or entity to make decisions about the RLC/TLC operational rules is needed that each TLC/RLC instance will provide reports.

Such reports to a control or coordination function can include, for a defined time interval, the traffic amount, the number of lost packets or the packet error rate or bit error rate or average delay or maximum delay for error correction through retransmissions using the ARQ mechanism.

The reports can also be provided per link, i.e. for all instances of the RLC or TLC belonging to a specific link. For example, CU communication with DU takes place over a downlink link and over an uplink link. For each link and over a defined time interval it can be provided, preferably by the TLC receiving side, a statistics for each UM and AM including the traffic amount, the number of lost packets or the packet error rate or bit error rate or average delay or maximum delay for error correction through retransmissions using the ARQ mechanism.

Another metrics to be reported can be the number of PDU sessions having 1% or more lost packets or the percentage of lost packets for a specific slice.

The above reports can be used by the RRC or RRM functions or by a CCord in load balancing or mobility base station or DU selection, as the overall link behavior is influenced by both the air interface and the transmission network.

Control (Signaling) Messages

In an embodiment of this invention, to each RLC/TLC entity operating in one of the TM, UM, AM can be assigned by a configuration message or by a control message a specific RLC/TLC instance.

A RLC/TLC instance can be controlled for changing its mode of operation, by configuring one RLC/TLC entity defined for an operation mode to include the specific RLC/TLC instance.

A RLC/TLC instance can be instructed to add more possibilities to the traffic filters, for example more QoS flows or more PDU sessions or to modify the existing packet filters by deleting some of the filter parameters, i.e. by removing from the filtering operation some QoS flows or PDU sessions.

Co-Located RLC and TLC

Figure 3:
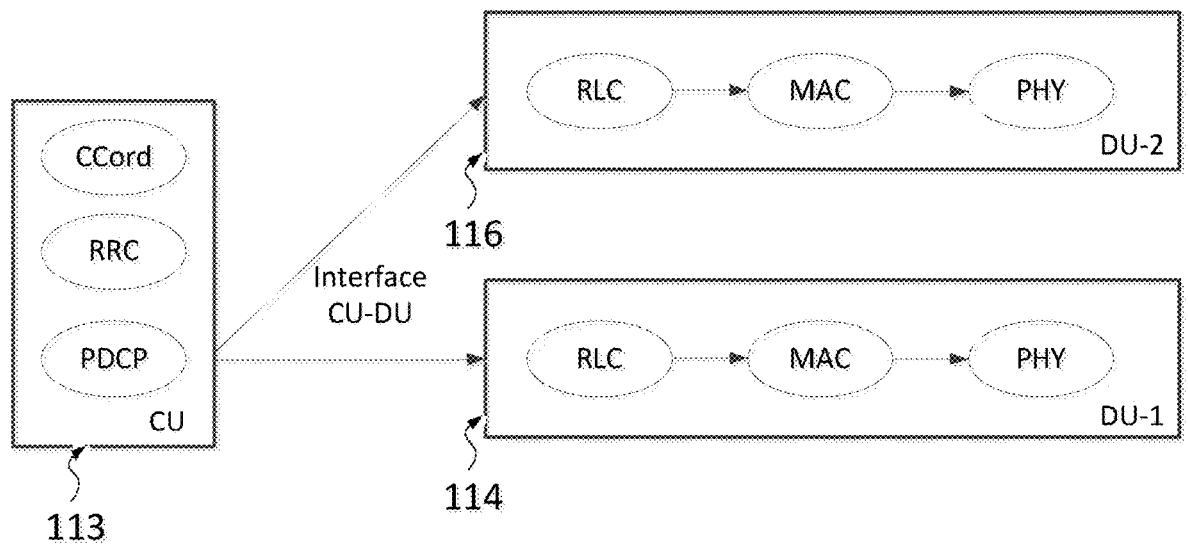
FIG. 3—Represents the user plane function chain for PDCP-RLC split (Existing Art)

FIG. 3 shows a CU-DU functional split for the higher layers, wherein the PDCP is located in the CU-113 while the RLC is located in the DU-114 and DU-116. No TLC functions are included.

FIG. 4 shows an example based on split 2 in 3GPP 38.801 for downlink direction, including the introduction of the transmit side of the TLC function (TLC-A) within the CU-113 and of the receive side of the TLC function (TLC-B) within the DU-114 and DU-116.

For other splits, for example split 3-1, 6 and 7-1 in 3GPP TR 38.801, the transport network connecting CU and DU is covered by the RLC function, in the sense that RLC extends from CU over DU through the air interface to UE while TLC covers the segment CU-DU which appears as a part of the bigger RLC. In these cases the TLC between CU and DU will act as inner error detection within the RLC.

Downlink UE Mobility Between DUs Connected to the Same CU

When the HO (handover) decision is taken by a controller or coordinator in the CU, it is needed to forward the PDCP packets to the destination DU-116 (serving DU after HO) instead of forwarding them to the source DU-114 (serving DU before HO).

The anchor point in split 2, when the delay of the transport network is small, is the PDCP layer, which will stop sending the packets to the source DU and will route them to the destination DU.

It is possible to take advantage of the architectures in FIG. 3 and FIG. 4, as described below. In all the options described below the RLC is informed by the relevant controller/coordinator in the CU about the HO decision for a UE or a PDU session of the UE or a QoS flow of the UE and about the destination DU IP address or identifier.

HO Option 1

Considering FIG. 3, while the RLC in source DU-114 uses TM or UM, the SN (Sequence Number) in the PDCP header for a PDU delivered within DU-114 by RLC to MAC layer (named SNt) is used to mark the last relevant PDCP PDU sent to UE, with the assumption that the UE PHY will not disconnect from the source DU-114 until the last PHY SDU was sent successfully or the H-ARQ process expired. This SNt is used for identifying the SDU of the RLC layer, i.e. the PDU of the PDCP layer within CU-113.

"Relevant PDU" means a RLC PDU which corresponds to the specific PDU session, Slice identifier, QoS Flow identifier for which the HO is done.

When the RLC in DU-114 uses AM, the SN in the PDCP header for a PDU delivered by RLC to MAC layer (named SNt) is used to mark the last PDU acknowledged by the RLC layer in UE and reported to the RLC layer in DU-114. This SN is used for identifying the SDU of the RLC layer.

The RLC layer sends through a signaling message over the CU-DU interface to the CU-113' relevant controller/coordinator the scalar representing SNt or (SNt+1).

All the SDUs having the PDCP SN higher than SNt will be forwarded by the PDCP layer or by the CU-113 to the destination DU-116.

The Option 1 procedure wherein the CU forwards the undelivered PDCP PDUs to destination DU is mostly suitable for low delay, low loss backhauls working in non-congestion state.

HO Option 2

In this option the delay or packet loss in the CU-DU link is high, while the delay between the source DU and the destination DU is lower and also the packet loss is lower.

The RLC in DU-114 in FIG. 3, based on an embodiment of this invention, shall buffer the SDUs for a time equal at least with the maximum backhaul delay. Based on the SNt obtained as in Option 1, the RLC layer within the source DU-114 forwards the SDUs having the SN of the PDCP layer higher than SNt directly to the destination DU-116 and announces, through a signaling message over the CU-DU interface, the PDCP layer in the CU-113 or a controller or coordinator in the CU the lowest and the highest SN of the forwarded SDUs towards the destination DU-116.

HO Option 3 for Architecture in FIG. 4

In this option the delay or packet loss in the CU-DU link is high, while the delay between the source DU-114 and the destination DU-116 is lower and also the packet loss is lower.

The TLC, based on an embodiment of this invention, shall buffer the SDUs for a time equal at least with the maximum backhaul delay.

For a downlink example, the RLC-B forwards the SNt obtained as in option 1 to the TLC-B in the DU-114. Based on a configuration transmitted by a signaling control message, TLC-B or RLC in DU-114 can either forward the PDCP packets to DU-116 as in Option 2 or use the PDCP SNt of the last successful reception by TLC-B in DU-114, with the assumption that all the received relevant packets will be delivered to UE before the PHY HO.

TLC-B in source serving DU-114 forwards the SDUs having the SN of the PDCP layer higher than SNt directly to the destination DU-116 and announces through a signaling message over the CU-DU interface to the PDCP layer in the CU or to a controller or coordinator in the CU the lowest and the highest SN of the forwarded SDUs.

Congestion Detection

In an embodiment of this invention the TLC transmitter is placed within the CU or DU infrastructure cellular entity and the TLC receiver is placed respectively in DU and CU entities.

In AM the transmitter receives by ACK/NACK the feedback on the success of transmissions and can provide, for a defined time interval, the number of lost packets or their percentage.

The time synchronization between the CU and DU is possible through different IP protocols or by satellite systems such as GPS. If a time stamp is added to the TLC PDUs, the receiver can determine the delay for each packet and create for a defined time interval a statistical representation (average, median, minimum, maximum, percentage of packets with the delay lower than a value) for the recorded delays.

This representation can be done per QoS flow, per Slice or per UE PDU session.

Based on the delay statistics and on the lost PDU statistics transmitted through signaling messages over the DU-CU interface to a control or coordination entity, a controller or coordinator can determine the congestion situation for a specific CU-DU link and decide to use another DU for part or all the UE-generated traffic.

The delay statistics and the lost PDU statistics can be also transmitted through signaling messages within the CU.

For implementing the avoidance of a congested traffic network, a controller/coordinator shall send a signaling message to the UE and to the PDCP layer in the CU for executing the HO of the UE or of a part of its traffic such to avoid using the congested CU-DU links.

DU Implementation

Figure 5:
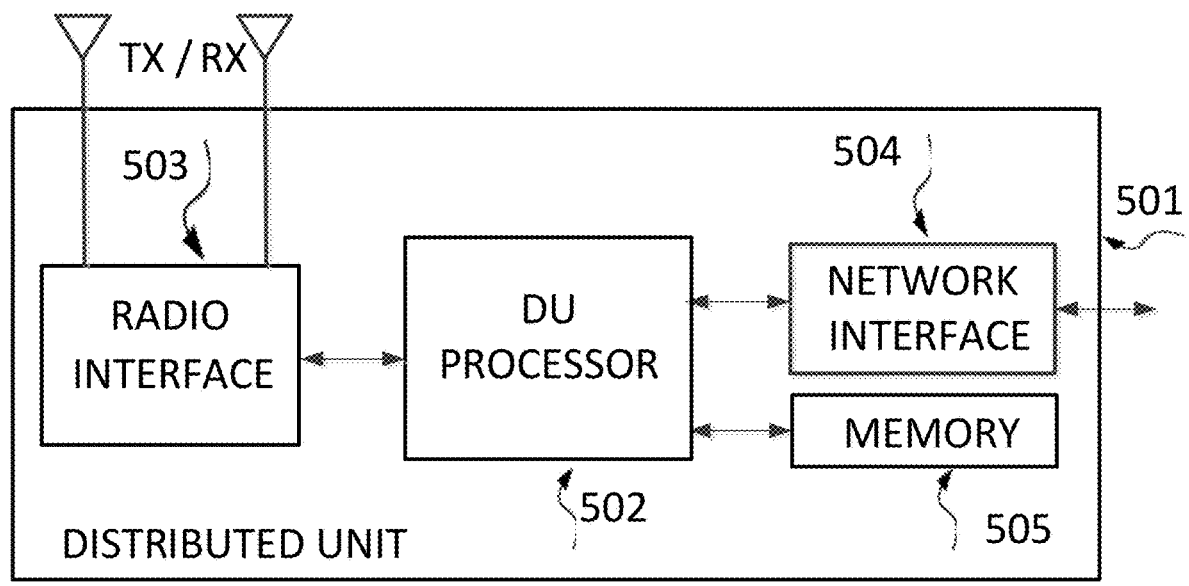
FIG. 5—Represents a Distributed Unit (DU) block diagram

The base station or DU blocks shown in FIG. 5 are only by way of examples; in practical implementations these blocks can be distributed on multiple circuit boards, and the control functions and hardware functions can be implemented on commercial processors or tailor-made logical arrays, such as system-on-a-chip, FPGAs, ASICs.

The functional blocks of the DU-501 identified as relevant to this invention are the radio interface 503, providing wireless communication with a UE, the network (communication) interface 504 enabling signaling (control) message transmission over the network, towards CU or to the OAM or to a Central Coordinator.

The processor 502 includes as a subset of its functions, some functions relevant to this invention, like RLC stack, TLC stack, configuring and obtaining reports from an UE and forwarding them to e central controller or coordinator. The data used by the processor is stored in a memory block —505.

Computing Platform for CU Implementation

Figure 6:
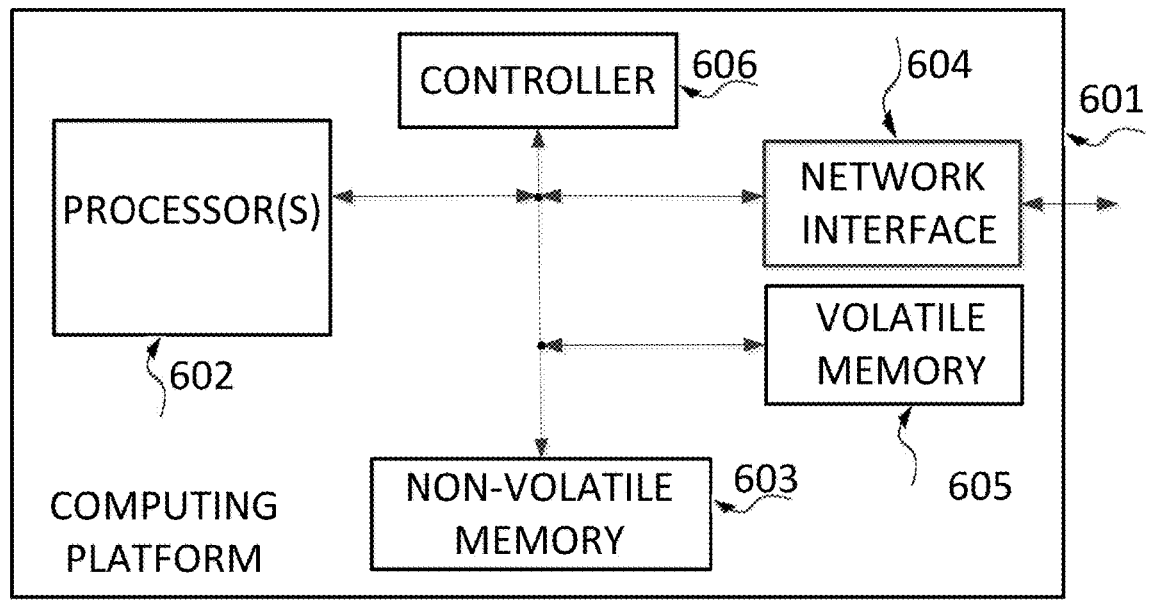
FIG. 6—Represents a Central Unit (CU) on a computing platform.

A computing platform 601 (see FIG. 6) is a system that consists of one or more processors 602, non-volatile memory 603, volatile memory 605, a network communication interface —604 and a system controller 606. An application, program or process runs over an operating system installed in the computing platform.

The processor can run software stacks for RRC, PDCP, TLC, RLC and coordinator implementation.

Central Coordinator

The Central Coordinator includes one or more software modules, adapted for controlling the system nodes based on the received information.

The Central Coordinator defines, controls the system nodes and the UE and receive operational status information from virtualized or non-virtualized base stations, UE and VM Controller.

The Central Coordinator includes hardware computing resources such as one or more processors, memory, communication interfaces.

The Central Coordinator may use dedicated enclosures or can run its software on virtual machines or on a base station or central unit processor or by other processing means for sharing resources with other software modules.

Technologies

As will be appreciated by those skilled in the art, the terminology used throughout the specification is mainly associated with the LTE standards and the 5G system. However, it should be understood that embodiments of the present invention encompass other existing and future cellular standards and other wireless systems used in terrestrial or satellite communications and both TDD and FDD duplexing modes.

The examples provided show certain ways of carrying out the invention. It is to be understood that the invention is not intended to be limited to the examples disclosed herein. Rather, the invention extends to all functionally equivalent structures, methods and uses, as are within the scope of the claims.

The invention claimed is:

1. A method for cellular network operation, comprising:
    establishing a transport network communication link in a cellular network between a first infrastructure cellular entity and a second infrastructure cellular entity for transmitting data packets containing user traffic, wherein the first and the second infrastructure cellular entities are selected from the list of at least one specific central unit of a base station and at least one specific distributed unit of the base station controlled by the specific central unit of the base station;
    establishing a first transport link control function within the first infrastructure cellular entity at one side of the transport network communication link and a pair transport link control function within the second infrastructure cellular entity at the other side of the transport network communication link;
    transmitting data packets through the first transport link control function to the pair transport link control function through the transport network communication link while allocating sequence numbers by the first transport link control function to the transmitted data packets;
    detecting by the pair transport link control function based on the sequence numbers a loss of a data packet transmitted by the first transport link control function;
    transmitting a status report indicative of the loss of the data packet to the first transport link control function from the pair transport link control function;
    transmitting reports from at least one of the first and second transport link control functions to a controller located in RAN (Radio Access Network) or to a coordinator of at least one base station in the cellular network regarding a behavior of the transport network communication link; and
    responsively to the reports, controlling forwarding of user traffic from the first infrastructure cellular entity to the second infrastructure cellular entity.

2. The method according to claim 1, wherein the first infrastructure cellular entity is a specific central unit or a specific distributed unit of the base station.

3. The method according to claim 1, wherein the the second infrastructure cellular entity is a specific central unit or a specific distributed unit of the base station.

4. The method according to claim 1, wherein establishing the first transport link control function and the pair transport link control function comprises establishing a specific transport link control function instance for at least one functionality selected from a list of functionalities consisting of a quality of service, a network slice, and a PDU (Protocol Data Unit) session.

5. The method according to claim 1, where the reports to the controller or to the coordinator regarding the behavior of the transport network communication link include at least one element selected from a list of elements consisting of a traffic amount, a number of lost packets, a packet error rate, a bit error rate, an average delay, a maximum delay, a median delay, a minimum delay, and a percentage of packets with the delay lower than a value.

6. The method according to claim 5, wherein the reports are used to assess a transport network congestion.

7. The method according to claim 6, and comprising, in case of an assessed congestion on a transport network link, sending an instruction from the controller or from the coordinator to a UE (User Equipment) to perform a handover to another base station or distributed unit.

8. The method according to claim 1, and comprising sending configuration or control messages from a control or coordination function or entity in the cellular network to the first or the pair transport link control function.

9. The method according to claim 8, wherein the coordination or control messages are sent to a Transport Link Control entity operating in one of a Transparent Mode, an Unacknowledged Mode, and an Acknowledged Mode assigns a specific Transport Link Control instance to that entity.

10. The method according to claim 9, wherein the coordination or control messages sent to a Transport Link Control entity operating in one of a Transparent Mode, an Unacknowledged Mode, and an Acknowledged Mode assigns specific operational parameters to the Transport Link Control entity or to a specific instance of the Transport Link Control entity.

11. The method according to claim 1, wherein responsively to a negative status report transmitted from the pair transport link control function, the first transport link control function executes a retransmission of the lost packet.

12. The method according to claim 1, wherein the distributed unit is a remote radio head.

13. The method according to claim 1, wherein the forwarding of the user traffic includes controlling a UE (User Equipment) to execute a handover from the second infrastructure cellular entity to a third infrastructure cellular entity.

14. The method according to claim 13, wherein the first transport link control function buffers the user traffic for a duration depending on a transport network delay.

15. The method according to claim 1, where the at least one distributed unit includes relay functionality.

16. A system for cellular network communications, comprising:
 a first infrastructure cellular entity and a second infrastructure cellular entity, which are configured to establish between them a transport network communication link in a cellular network for transmitting data packets containing user traffic,
 wherein the first and the second infrastructure cellular entities are selected from the list of at least one specific central unit of a base station and at least one specific distributed unit of the base station controlled by a central unit of the base station and wherein the first infrastructure cellular entity is configured to establish a first transport link control function at one side of the transport network communication link, and the second infrastructure cellular entity is configured to establish a pair transport link control function at the other side of the transport network communication link, and
 wherein the first infrastructure cellular entity is configured to transmit data packets through the first transport link control function to the pair transport link control function through the transport network communication link while allocating sequence numbers by the first transport link control function to the transmitted data packets, and the pair transport link control function is configured to detect, based on the sequence numbers, a loss of a data packet transmitted by the first transport link control function and to transmit a status report indicative of the loss of the data packet to the first transport link control function from the pair transport link control function, and
 wherein at least one of the first and second transport link control functions is configured to transmit reports to a controller located in RAN (Radio Access Network) or to a coordinator of at least one base station in the cellular network regarding a behavior of the transport network communication link, wherein forwarding of user traffic from the first infrastructure cellular entity to the second infrastructure cellular entity is controlled responsively to the reports.

17. The system according to clause 16, where the specific distributed unit includes relay functionality.

18. A distributed unit for use in a base station in a cellular network, the distributed unit being controlled by a specific central unit of the base station and comprising:
 a radio interface configured to communicate over a wireless link with user equipment in a cellular network;
 a network interface configured to communicate with the specific central unit of a base station or with another distributed unit of the base station over a transport network of the cellular network; and
 a processor, which is configured to establish a transport network communication link via the transport network with the specific central unit of the base station or with the other distributed unit of the base station for transmitting data packets containing user traffic, and to establish a first transport link control function within the distributed unit, for interaction with a pair transport link control function within the specific central unit of the base station or within the other distributed unit of the base station,
 wherein the first transport link control function is configured to transmit data packets through the first transport link control function to the pair transport link control function through the transport network communication link while allocating sequence numbers to the transmitted data packets, whereby the pair transport link control function detects, based on the sequence numbers, a loss of a data packet transmitted by the first transport link control function and transmits a status report indicative of the loss of the data packet to the first transport link control function, and
 wherein at least one of the first and second transport link control functions transmits reports to a controller located in RAN (Radio Access Network) or to a coordinator of the base station regarding a behavior of the transport network communication link, and forwarding of user traffic from the distributed unit to the specific central unit or to the other distributed unit is controlled responsively to the reports.

19. The distributed unit according to clause 18, where the distributed unit or the other distributed unit include relay functionality.

* * * * *